(12) United States Patent
Truwit et al.

(10) Patent No.: US 6,257,407 B1
(45) Date of Patent: Jul. 10, 2001

(54) BRIEFCASE FOR LAPTOP COMPUTER

(75) Inventors: Charles L. Truwit; Daryl G. Nelson, both of Wayzata, MN (US)

(73) Assignee: LapCase, LLC, Wayzata, MN (US)

( * ) Notice: Subject to any disclaimer, the term of this patent is extended or adjusted under 35 U.S.C. 154(b) by 0 days.

(21) Appl. No.: 09/421,726

(22) Filed: Oct. 20, 1999

(51) Int. Cl.[7] .................................................. B65D 85/38
(52) U.S. Cl. ............................................ 206/320; 206/305
(58) Field of Search ................................... 206/305, 320; 190/108, 110, 112, 113

(56) References Cited

U.S. PATENT DOCUMENTS

| | | | | |
|---|---|---|---|---|
| 4,929,948 | * | 5/1990 | Holmberg | 190/110 |
| 5,010,988 | * | 4/1991 | Brown | 190/111 |
| 5,437,367 | * | 8/1995 | Martin | 206/320 |
| 5,445,266 | * | 8/1995 | Prete et al. | 206/320 |
| 5,524,754 | * | 6/1996 | Hollingsworth | 206/320 |
| 5,547,052 | * | 8/1996 | Latshaw | 190/108 |
| 5,647,484 | * | 7/1997 | Fleming | 206/320 |
| 5,678,666 | * | 10/1997 | Shyr et al. | 190/110 |
| 5,808,865 | * | 9/1998 | Alves | 206/320 |
| 5,881,934 | * | 3/1999 | Hung | 206/320 |
| 6,012,557 | * | 1/2000 | Derelanko | 190/110 |

* cited by examiner

*Primary Examiner*—Jim Foster
(74) *Attorney, Agent, or Firm*—Schwegman, Lundberg, Woessner & Kluth, P.A.

(57) ABSTRACT

A briefcase for a computer includes a first compartment for carrying the computer and peripherals. The first compartment includes a cover which has a hinge mechanism intermediate said cover. The computer briefcase also includes a second compartment attached to the first compartment. The first compartment is accessible from the exterior of the computer briefcase. In other words, the access can be gained to the computer and its peripherals by leaving the computer within the case and opening a cover. The cover is hinged so that the top of the first compartment does not extend above the top of the opened computer. The briefcase also includes a sliding drawer that advances the computer toward the user without having to move the briefcase itself, such that the computer lid may be opened on an airplane. The briefcase also includes a holding mechanism for holding the computer within the first compartment. The computer briefcase can also be part of a luggage system. The bag for holding a computer includes a first portion of an attachment mechanism attached to the exterior of the bag for holding a computer. The first portion of the attachment mechanism can be attached to another briefcase or to a hanging bag.

18 Claims, 7 Drawing Sheets

BRIEFCASE FOR LAPTOP COMPUTER

FIELD OF THE INVENTION

This invention pertains to the field of luggage and more particularly to the field of a briefcase for a laptop computer.

BACKGROUND OF THE INVENTION

Briefcases come in a variety of styles, shapes and sizes. Currently there are specialized briefcases for computers. Computers are delicate so the briefcases are padded and include special compartments to hold a laptop or portable computer. In most instances, users of such briefcases, such as business travelers, have to open up the briefcase and remove the computer from its padded compartment in order to use the computer. Alternatively, the computer is removed from a pocket of the carrying case. In either scenario, the user has to dig out all the various items, such as papers, which are needed to complete a task, before the briefcase is stowed. If something additional is needed, the briefcase must be retrieved from the place it is stowed so that the additional items may be accessed.

In addition to problems associated with working with these current computer briefcases, these briefcases also are not expandable. In other words, these briefcases are very specialized to carrying a laptop or a personal computer. The briefcases typically provide spaces for AC/DC adapters, cables, floppy disks, several pens and pencils and not much else. Typically, computer briefcases do not leave much room for files, books, or other items not related to the computer. As a result, many users are forced to carry one briefcase to hold the computer and another briefcase to hold papers and other items necessary to accomplishing work tasks. For a business traveler, this turns into a logistical problem. The business traveler may carry on all his or her luggage. As a result, the business traveler going to stay overnight will have two or three bags. For example, a business traveler going on an overnight trip may be required to carry a hanging bag, a specialized computer briefcase and a general briefcase for holding items necessary for completing work tasks. This can be difficult to handle if the business traveler desires to carry on all his or her baggage. Fumbling with three bags can be difficult even for the most savvy business traveler. To simplify slightly, the business traveler can cut the luggage down to two bags by placing any additional items or papers needed for work into a compartment of the hanging bag. Handling two bags is fairly straight-forward; however, airlines are now restricting the number of carry-on bags each passenger may bring into the passenger cabin for safety reasons. Some airlines now allow passengers to carry on only one bag. Therefore there is a need for a system that allows passengers to present one bag to the airlines that can be carried on and which organizes clothes, a computer and related peripheral items, as well as papers and other items necessary for doing work.

SUMMARY OF THE INVENTION

A briefcase for a computer includes a first compartment for carrying the computer and peripherals. The first compartment includes a cover which has a hinge mechanism intermediate said cover and a sliding drawer that is advanced in the direction of the briefcase handle. The computer briefcase also includes a second compartment attached to the first compartment. The first compartment is accessible from the exterior of the computer briefcase. In other words, the access can be gained to the computer and its peripherals by leaving the computer within the case and opening a cover. The cover is hinged so that the top of the first compartment does not extend above the top of the opened computer. The briefcase also includes a holding mechanism for holding the computer within the first compartment. The first compartment also has a floor which includes several portions for holding computer peripherals. The computer briefcase can also be part of a luggage system. The bag for holding a computer includes a first portion of an attachment mechanism attached to the exterior of the bag for holding a computer. The first portion of the attachment mechanism can be attached to another briefcase or to a hanging bag.

Advantageously, the bag for holding the computer is part of a luggage system on which various bags may be attached to one another so that one bag is formed for purposes of carry on luggage for airline travel. This allows the traveler to handle one bag until he or she gets to his or her seat. He or she can then detach the computer bag portion for use and stow the remaining portion of the luggage. The system is flexible in that a hanging bag may be attached to the computer bag or another briefcase section can be attached to the computer bag or both of the above may be attached to the computer bag. The end result is that the traveler can configure the luggage to match his or her needs for a particular trip.

In addition, the computer bag is advantageous since it can be used on a plane or in other situations without having to remove the computer from the first compartment. The first compartment holds the computer and several needed peripherals. The second compartment can be accessed to get papers or other items needed for work. The hinged cover and sliding tray of the first compartment also provides adequate clearance between the briefcase and the chair back in front of the user.

DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
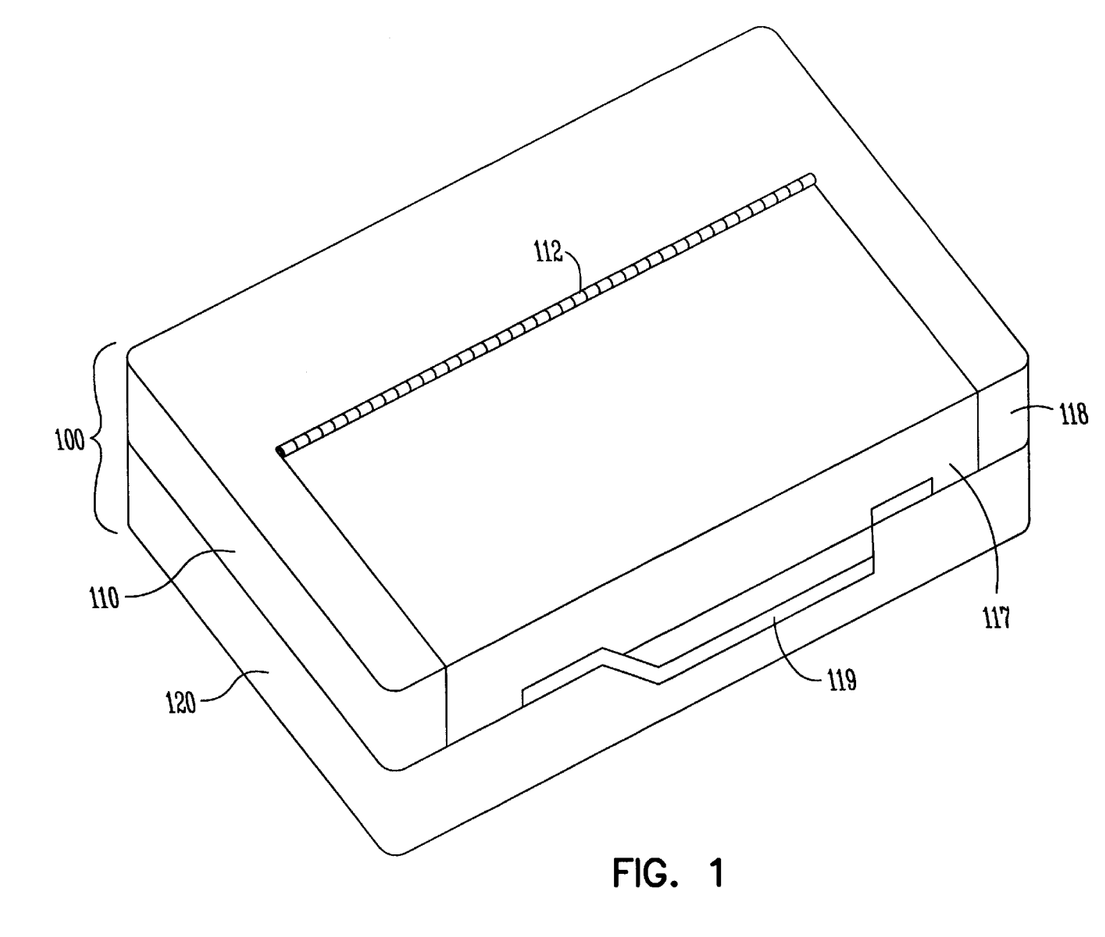
FIG. 1 is an isometric view from the top of a closed briefcase (first embodiment) for carrying a laptop or portable computer.
Figure 2:
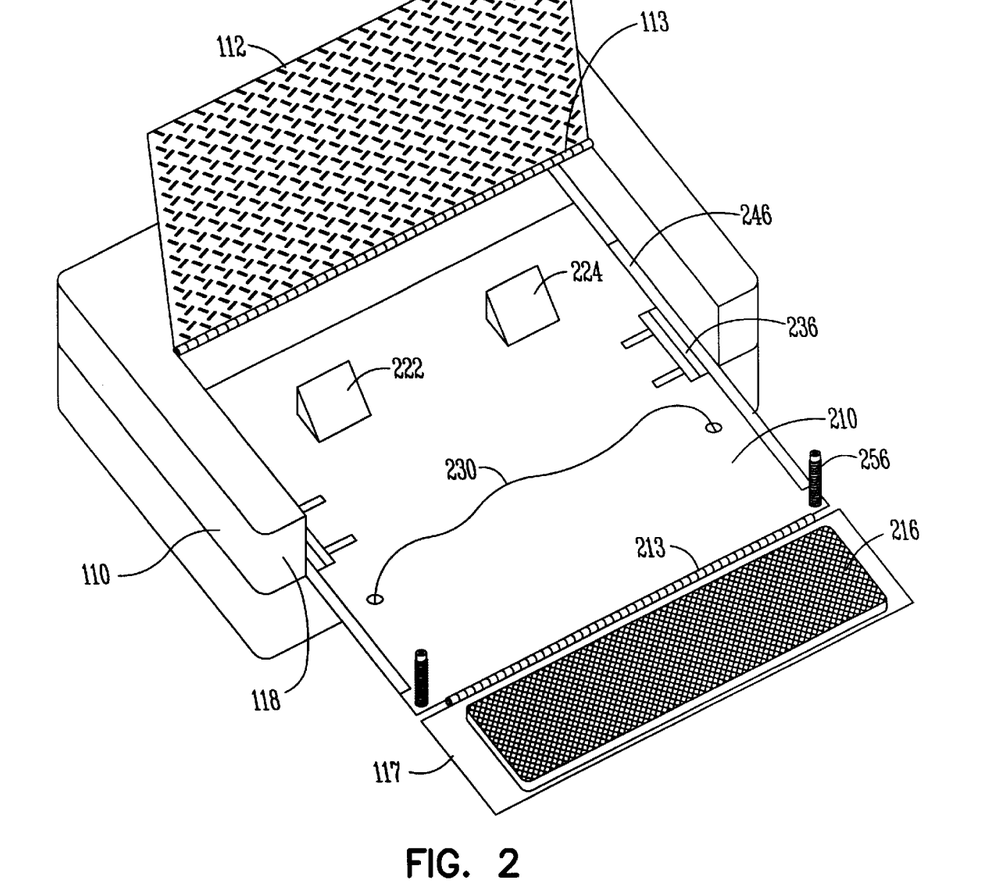
FIG. 2 is an isometric view from the top and front of an opened briefcase (first embodiment) for carrying a laptop or portable computer.
Figure 3:
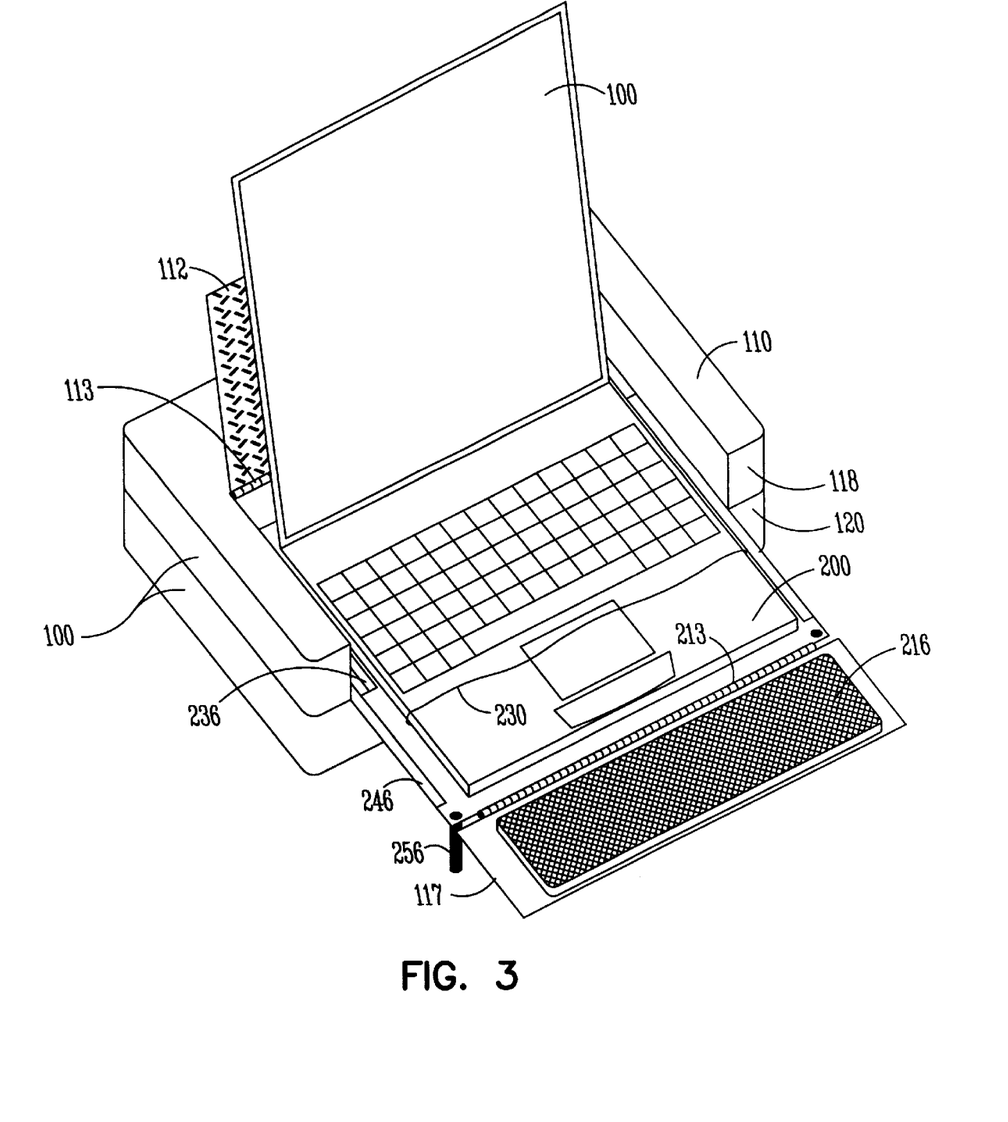
FIG. 3 is an isometric view from the top and front of an opened briefcase (first embodiment) for carrying a laptop or portable computer with an open laptop computer shown in its appropriate position.

FIGS. 1–3 detail one preferred embodiment of a briefcase 100 for a laptop or portable computer. FIG. 1 is an isometric view of the top of a closed briefcase 100 for carrying a laptop or portable computer (shown in FIGS. 3). As shown in FIG. 1, the briefcase 100 includes a first compartment 110 and a second compartment 120. The first compartment 10 carries a laptop or portable computer while the second compartment 120 of the briefcase 100 carries other materials such as papers, files and spare pens and pencils that will be necessary for a meeting or for completing a task while using the portable computer. The first compartment 110 houses the computer. The first compartment 110 includes a lid or cover 112 that is hingably attached to the first compartment 110 by virtue of a hinge 113 and a hinged front wall component 117. The lid or cover 112 and hinged front wall 118 can be moved to a second set of positions to gain access to the first compartment 110. The first compartment 110 also includes a front wall 118. The front wall 115 includes a hinged component 117. The hinge attached to hinged component 117 is not shown in FIG. 1. The hinge 213 is best shown in FIG. 2. The hinged component 117 also includes an attached handle 119 positioned on an exterior surface of the wall.

FIG. 2 is an isometric top view from the top and front of the open briefcase 100 for carrying a laptop or portable computer 200. The laptop 200 is a conventional laptop or portable computer such as an IBM Think pad or other similar computer. The hingably attached component 117 that is situated within the slot of front wall 118 actually folds out or folds down and has a wrist pad 216 attached to the interior surface of the hinged component 117. As shown in FIG. 2, the wrist pad 216 is in its folded down position (hence, not visible in FIG. 1) so that the user has a wrist pad surface upon which to rest his or her wrists while using the computer 200. The first compartment 110 also includes a sliding drawer 210 that is connected to a second hinge 213 that is connected to the fold-down wrist pad 216. When the sliding drawer 210 is released from its locked, closed position, and when it is advanced toward the user (i.e. in the direction of the handle 119, the computer 200 itself is advanced with the sliding drawer 210 and the computer lid may be, advantageously, opened without encumbrance from the chair back directly in front of the user (if on an airplane or some other tight user space, for example).

As shown in FIG. 2, the cover or lid 112 is opened to an upright position so that when the sliding drawer 210 is advanced, the computer 200 can be opened and the screen of the computer can be displayed. As noted above, the hinge 113 is attached to the first compartment 110 and the lid 112 of the first compartment 110. In a typical example, the hinge 113 is attached at about two-thirds the depth of the first compartment 110.

The interior of the first compartment 110 includes a floor which is in fact the sliding drawer 210. Attached to the floor may be a first elevator 222 and a second elevator 224. The first and second elevators 222 and 224 may be used to adjust the angle of the computer 200 with respect to the floor or drawer 210 of the first compartment 110. It should be noted that the elevators 222 and 224 can be made of any material such as foam rubber, a more durable rubber, or plastic or any other appropriate material. In addition, the elevators 222 and 224 need not necessarily be bar-shaped portions. Other elevation means could also be employed. Also attached to the sliding floor 210 of the first compartment 110 is a computer restraint 230. The computer restraint 230 might be a taut cable that is removably and adjustably attached to the sliding drawer 210. Advantageously, the restraint 230 is made of a material such as plastic or metal, which is capable of deforming within an elastic range such that it provides a spring force that keeps the computer 200 attached to sliding drawer 210 of the first compartment 110 in the event the briefcase is tilted or dropped.

In addition to the restraint cable 230 (or other such securing mechanism), there are two sliding side mechanisms 236 for securing the computer portion (bottom) of the laptop computer to the sliding drawer 210 such that in the event of a lateral tilt of the briefcase, the computer is not inclined to slide or move laterally. In addition, to ensure seamless operation of the sliding drawer 210, the drawer 210 is supported by sliding casters 246. In addition, attached to the sliding drawer 210 are two pedestal posts 256 which may be deployed downward to create a stable tabletop of the sliding drawer 210 when used on a table or desktop. (For simplicity of the drawings, cable 230 is not shown.)

FIG. 3 is a copy of FIG. 2, but with an exemplary laptop computer shown in the open position and situated on the sliding drawer 210 of the first compartment 110. In this example, the pedestals 256 have been deployed downward.

Figure 4:
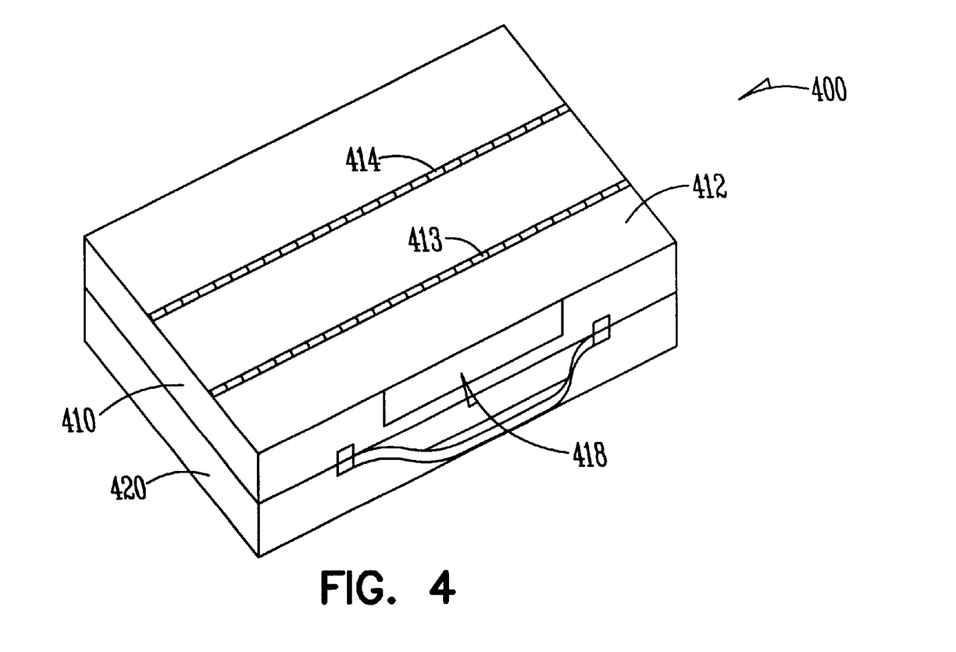
FIG. 4 is an isometric view from the top of a closed briefcase (second embodiment) for carrying a laptop or portable computer.
Figure 5:
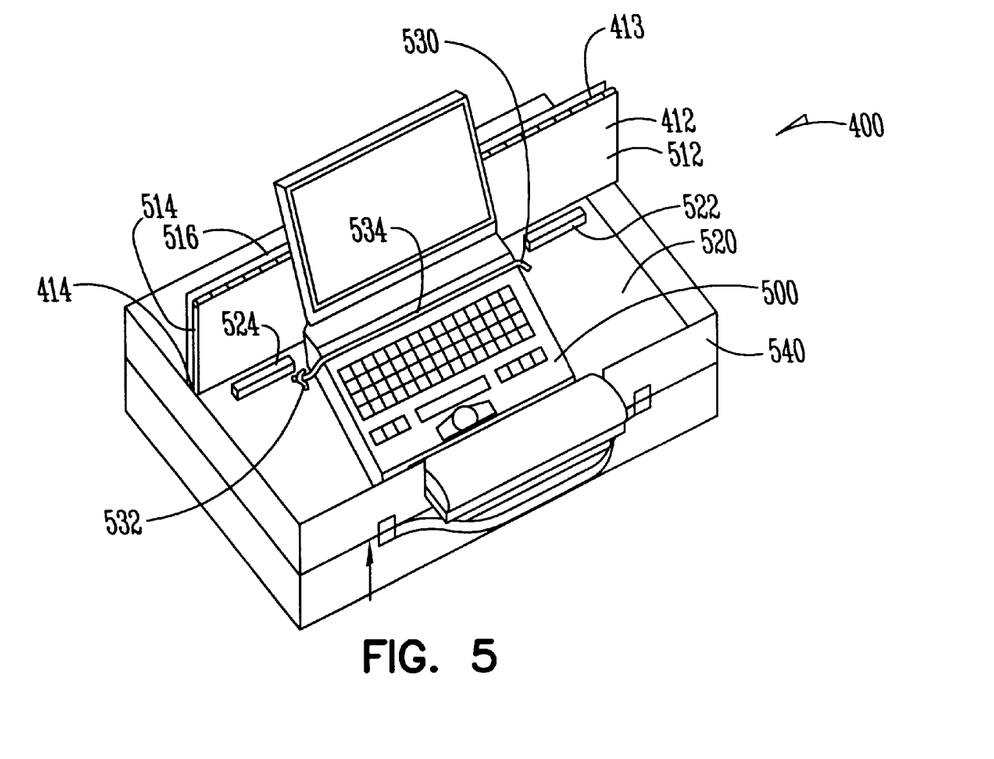
FIG. 5 is an isometric view from the top and front of an opened briefcase (second embodiment) for carrying a laptop or portable computer.
Figure 6:
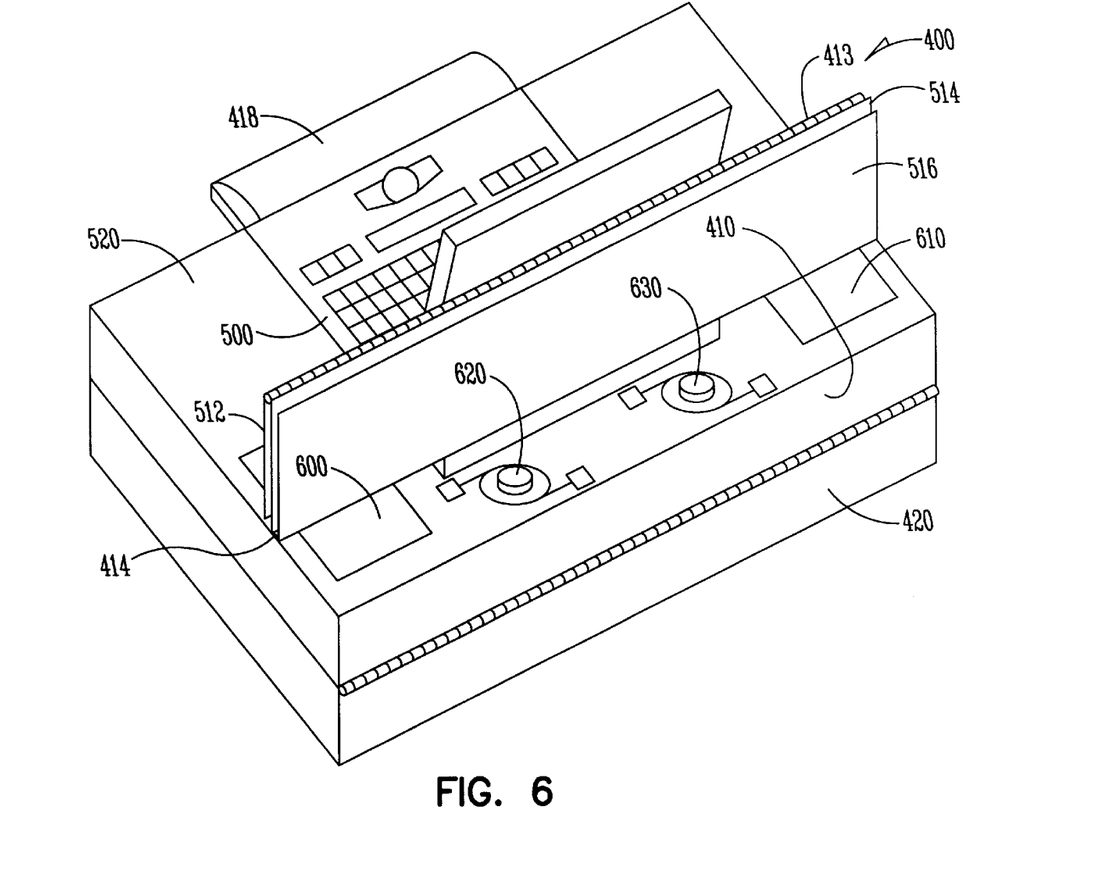
FIG. 6 is an isometric view from the top and front of an opened briefcase (second embodiment) for carrying a laptop or portable computer with an open laptop computer shown in its appropriate position.

FIGS. 4–6 show another preferred embodiment of a briefcase 400 for a laptop or portable computer. FIG. 4 is an isometric view of the top of a closed briefcase 400 for carrying a laptop or portable computer (shown in FIGS. 2 and 3). As shown in FIG. 4, the briefcase 400 includes a first compartment 410 and a second compartment 420. The first compartment 410 houses the computer. The first compartment 410 includes a lid or cover 412 that has a first hinge 413 and a second hinge 414 therein. The first compartment 410 also includes a fold-out or fold-down wrist pad 418. As shown in FIG. 4, the wrist pad 418 is in its folded position. The first compartment 410 carries a laptop or portable computer while the second compartment 420 of the briefcase 400 carries other materials such as papers, files and spare pens and pencils that will be necessary for a meeting or for completing a task while using the portable computer.

FIG. 5 is an isometric top view from the top and front of the open briefcase 400 for carrying a laptop or portable computer 500. The laptop 500 is a conventional laptop or portable computer such as an IBM Thinkpad or other similar computer. As shown in FIG. 5, the cover or lid 412 is folded or placed in an upright position so that the computer 500 can be opened and the screen of the computer can be displayed. The cover or lid 412 in its folded position is lower than the unfolded position of the display associated with the computer 500. The hinge 414 is attached to the first compartment 410. The hinge 413 is not attached to the first compartment, but is attached to two panels of the lid 412. It should be noted that the lid 412 is divided into a first panel 512, a second panel 514 and a third panel 516. The hinge 414 is attached at about two-thirds the depth of the first compartment 410. The interior of the first compartment 410 includes a floor 520. Attached to the floor are a first elevator 522 and a second elevator 524. The first and second elevators 522 and 524 are used to adjust the angle of the computer 500 with respect to the floor 520 of the first compartment 410. It should be noted that the elevators 522 and 524 can be made of any material such as foam rubber or a more durable rubber. In addition, the elevators 522 and 524 need not necessarily be bar-shaped portions. Other elevation means could also be employed. Also attached to the floor 520 of the first compartment 410 is a computer restraint 530. The computer restraint includes a hook 532 and a bar 534. The hook 532 is attached to the floor 520 of the first compartment. The bar 534 is also attached to the floor 520 of the first compartment 410. The bar is rotatably attached to the floor such that the bar can be moved over a portion of the computer keyboard and latched onto the hook 532. Advantageously, the bar 534 is made of a material such as plastic or metal, which is capable of deforming within an elastic range such that it provides a spring force that keeps the computer 500 attached to the first compartment 410 in the event the briefcase is tilted or dropped. It should be noted that an elastic band could also be substituted for the bar 534. The first compartment 410 also includes a front wall 540 which has a slot therein. Positioned within the slot is the fold-down or fold-out wrist pad 418. The wrist pad 418 is hingedly attached to the slot in the front wall of the first compartment 410. After the lid is placed in an upright position, the wrist pad 418 can be folded downward so that the user has a wrist pad surface upon which to rest his or her wrists while using the computer 500.

FIG. 6 is an isometric view from the top and back of the open briefcase 400 for carrying the laptop or portable computer 500. FIG. 6 illustrates what is behind the panels 512, 514 and 516. In the floor 520 of the first compartment 410 is a first recess 600 and a second recess 610. The recesses 600 and 610 are sized so that AC/DC power converters or peripheral drives such as Iomega zip drives can be housed or stored within the recesses 600 or 610. Other computer peripherals, such as floppy drives, can also be stored within the recesses 600 or 610. A battery could also be stored within the recesses 600 or 610. Within the floor 520 of the first compartment 410 is a retractable power cord 620 and a retractable modem cord or modem telephone line 630. One end of the retractable power cord attaches to the back side of the portable computer 500. One end of the modem cord 630 is attached to the modem card on the back side of the computer 500. Each of the retractable cords allows the user to pull the cord out and plug it into either a phone jack or a power jack, therefore allowing connections to be made directly to the computer 500. Once the need for power or a modem is over, the user merely disconnects either the power cord or the modem cord and then pulls it out slightly and lets it retract into the retractable spaces 620 or 630. Advantageously, the three panels 512, 514 and 516 fold up to allow the user to have access to the back portion of the computer so that other connections can be made such as for a printer cable which might be necessary to attach the portable computer to a stationary printer in a work area. It should also be noted that the retractable power cord 620 and the retractable modem cord 630 can be attached to an internal surge protection unit (not shown).

Advantageously, when the work is over, the power cords can be merely retracted therein. The lid of the computer 500 can be folded down and snapped into place, the folding wrist pad can be folded up into the slot of the front face 540 of the first compartment 410, and the cover or lid 412 can be folded down and attached. It should also be noted that portions of the lid may be padded in order to protect the portable computer 500 during transport. All the joints and stress spots of the briefcase 400 are reinforced. In addition, Velcro can be used to affix various components. For example, Velcro could be used to attach the battery to a particular recess 610 within the first compartment 410.

It should also be understood that although a hard briefcase is shown in FIGS. 1–6, the material from which the briefcase is made is not determinative of this invention. For example, the briefcase could be made of metal or of canvas or nylon material including kevlar. In still other preferred embodiments soft-sided materials are used to form a briefcase. The first component 110 or 410 can be covered with a softsided material. The hinges can be eliminated or replaced with living hinges. The soft-sided material can be rolled to form a back on which the screen of the portable or laptop computer 500 can be rested. The soft-sided material could also be rolled over the top of the edge 118 to provide further padding and support for the wrist pad. Zippers could be used to separate the portion 117 in the front wall 118 from the lid 112 or cover.

Figure 7:
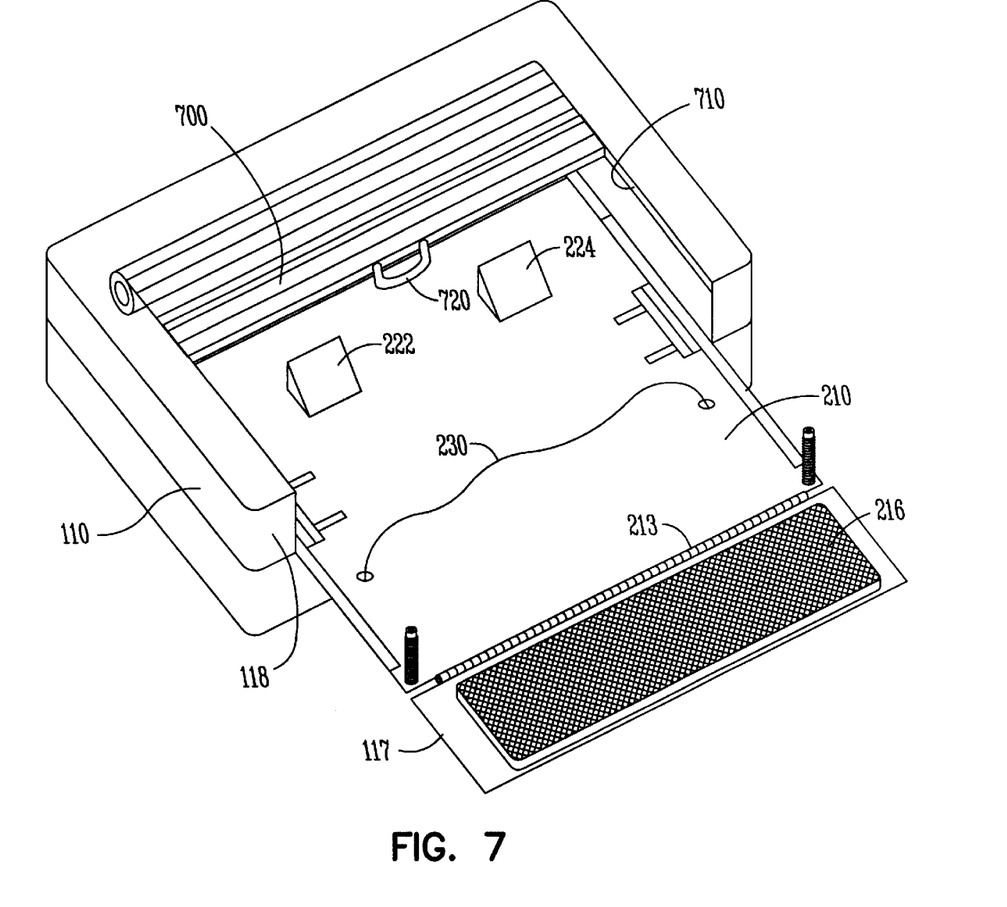
FIG. 7 is an isometric view from the top and front of an opened briefcase (third embodiment) for carrying a laptop or portable computer.

FIG. 7 is an isometric top view from the top and front of another embodiment of a briefcase 100. The briefcase 100 for carrying a laptop or portable computer is shown in an open position. The laptop is not shown in FIG. 7. The laptop is a conventional laptop or portable computer such as an IBM Thinkpad or other similar computer. Access is gained to the first compartment 110 of the briefcase via a rolltop 700. The rolltop 700 is a hinged top that allows the top to flex. The rolltop has edges 710 that ride inside of rails situated in the top of the first compartment 110. The rolltop has a mechanism that rolls the rolltop 700 into a coiled state. The rolltop 700 includes a handle 720 for moving the rolltop between a first position where the rolltop 700 covers the first compartment 110 and a second position where the rolltop 700 is fully retracted so that the first compartment is exposed. As shown in FIG. 7, the rolltop 700 is positioned between the first position and the second position. The first compartment 110 also includes a sliding drawer 210 that is connected to a second hinge 213 that is connected to the fold-down wrist pad 216. The wrist pad 216 and the portion 117 attached to the sliding drawer folds up to fully enclose the first compartment 110. As shown in FIG. 7, the wrist pad 216 is in its folded down position so that the user has a wrist pad surface upon which to rest his or her wrists while using the computer 200. The sliding drawer 210 may be released from its locked, closed position, and advanced toward the user. By pulling the drawer 210 out from the first compartment 110, the computer 200 (not shown) and the drawer 210 are advanced in unison. Advantageously, the sliding drawer 210 and the computer may be accessed without encumbrance from the chair back directly in front of the user (if on an airplane or some other tight user space, for example).

Figure 8:
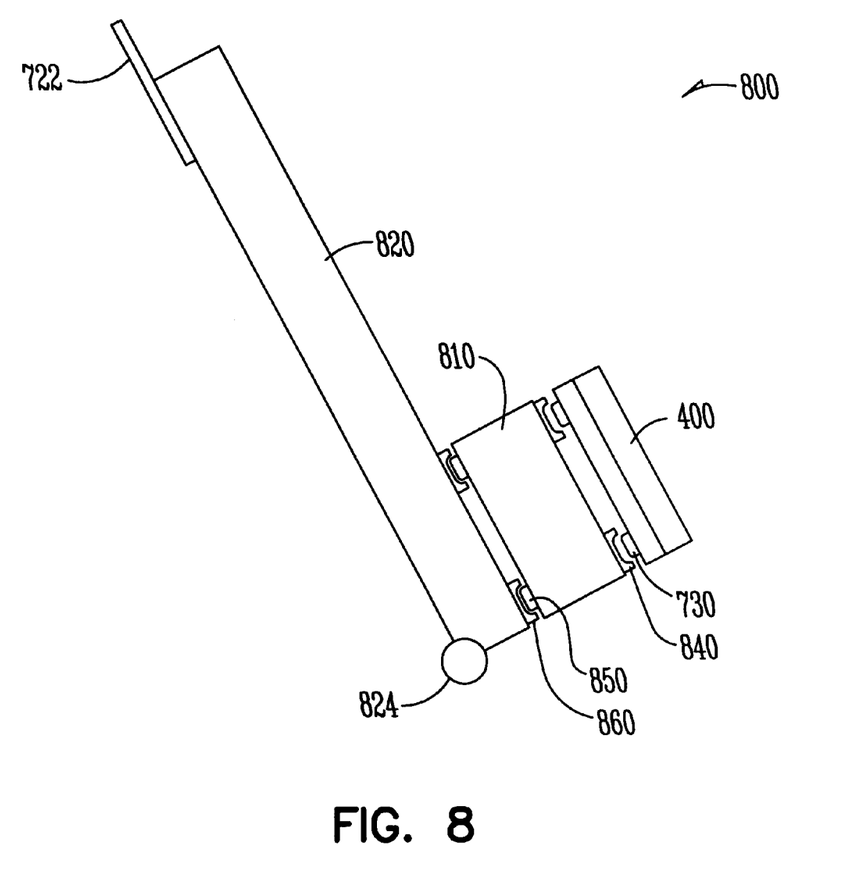
FIG. 8 is a side view of a luggage system including the briefcase for carrying a laptop or portable computer of FIGS. 1–7.

Now turning to FIG. 8, a side view of a luggage system 800 which includes the briefcase 400 for carrying a laptop or portable is shown. The luggage system 800 includes the briefcase 400, a second briefcase 810 and a hanging bag 820. The hanging bag 820 includes a handle 822 and a wheel which allows the hanging bag 820 to be easily maneuvered in travel situations such as through airports and down aisles of various vehicles. The hanging bag 820, the briefcase 810 and the computer carrying case 410 are all provided with interchangeable attachment mechanisms. The briefcase 400 includes a first attachment mechanism 830 which includes one or more attachment portions. The second briefcase 810 includes a second attachment portion 840 which is attached to a first side of the briefcase and a third attachment portion 850 attached to the other side of the briefcase 810. The hanging bag 820 includes a fourth attachment portion 860. Each of the attachment portions 830, 840, 850, and 860 are interchangeable such that the briefcase 400 can be attached to either the hanging bag 820 or to the additional briefcase 810. In essence, the user can then configure his or her luggage for the purpose of a particular trip. For example, if a business trip is merely a day trip, an overnight bag 820 is not necessarily needed, so the briefcase 810 can merely be attached to the computer carrying bag 400. If the business trip does not require an inordinate amount of paper or other items necessary to complete work, the briefcase 810 can be removed and the computer bag 400 can be directly attached to the hanging bag 820.

The interior of the first compartment 110 includes a floor which is in fact the sliding drawer 210. Attached to the floor may be a first elevator 222 and a second elevator 224. The first and second elevators 222 and 224 may be used to adjust the angle of the computer 200 with respect to the floor or drawer 210 of the first compartment 110. It should be noted that the elevators 222 and 224 can be made of any material such as foam rubber, a more durable rubber, or plastic or any other appropriate material. In addition, the elevators 222 and 224 need not necessarily be bar-shaped portions. Other elevation means could also be employed. Also attached to the sliding floor 210 of the first compartment 110 is a computer restraint 230. The computer restraint 230 might be a taut cable that is removably and adjustably attached to the sliding drawer 210. Advantageously, the restraint 230 is made of a material such as plastic or metal, which is capable of deforming within an elastic range such that it provides a spring force that keeps the computer 200 attached to sliding drawer 210 of the first compartment 110 in the event the briefcase is tilted or dropped.

Advantageously, the bag for holding the computer is part of a luggage system on which various bags may be attached to one another so that one bag is formed for purposes of carry-on luggage for airline travel. This allows the traveler to handle one bag until he or she gets to his seat. He or she can then detach the computer bag portion for use and stow the remaining portion of the luggage. The system is flexible in that a hanging bag may be attached to the computer bag or another briefcase section can be attached to the computer bag or both of the above may be attached to the computer bag. The end result is that the traveler can configure the luggage to match his or her needs for a particular trip.

In addition, the computer bag is advantageous since it can be used on a plane or in other situations without having to remove the computer from the first compartment. The first compartment holds the computer and several needed peripherals. The second compartment can be accessed to get papers or other items needed for work. The hinged cover for the first compartment also provides adequate clearance between the briefcase and the chair back in front of the user.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A briefcase for a computer comprising:
    a first compartment for carrying the computer and peripherals, said first compartment further comprising a cover for said first compartment which includes a hinge mechanism intermediate said cover;
    a second compartment attached to the first compartment; and
    a forward sliding drawer that is contained within the first compartment, wherein the first compartment further comprises a means for securing the computer to the sliding drawer.

2. The briefcase of claim 1 further comprising a computer holding mechanism for holding the computer within the first compartment.

3. The briefcase of claim 1 herein the first compartment further comprises means for adjusting the angle which the computer makes with respect to the first compartment.

4. The briefcase of claim 1 wherein the cover of the first compartment includes a plurality of hinges.

5. The briefcase of claim 1 wherein the first compartment includes a wrist pad.

6. The briefcase of claim 1 wherein access to a laptop computer placed within the first compartment is from the cover of the first compartment.

7. The briefcase of claim 1 wherein at least a third compartment may be removably attached to the second compartment.

8. A briefcase for a computer comprising:
    a first compartment for carrying the computer and peripherals, said first compartment further comprising a cover for said first compartment which includes a hinge mechanism intermediate said cover; and
    a second compartment attached to the first compartment, wherein the first compartment further comprises a floor positioned between the sliding drawer of the first compartment and the second compartment, said floor including at least one opening to the second compartment, said openings for transmitting cables from computer peripherals within the second compartment to the computer within the first compartment.

9. A luggage system comprising:
    a briefcase for holding a computer, said briefcase having an exterior and an interior, the briefcase further including:
        a first compartment for carrying the computer and peripherals, said first compartment further comprising a cover for said first compartment which includes a hinge mechanism intermediate said cover;
        a second compartment attached to the first compartment; and
        a forward sliding drawer that is contained within the first compartment, wherein the first compartment further comprises a means for securing the computer to the sliding drawer; and
    a first portion of an attachment mechanism attached to the exterior of the briefcase for holding a computer.

10. The luggage system of claim 9 further comprising:
    a bag or case having a second portion of an attachment mechanism attached to the exterior of the briefcase.

11. The luggage system of claim 9 further comprising:
    a hanging bag having a second portion of an attachment mechanism attached to the exterior of the hanging bag.

12. The luggage system of claim 10 having a third portion of an attachment mechanism attached to the exterior of the briefcase.

13. The luggage system of claim 12 further comprising:
    a hanging bag having a fourth portion of an attachment mechanism attached to the exterior of the hanging bag, wherein the first and second portions of the attachment mechanism are attachable to one another and the third and fourth portions of the attachment mechanism are attachable to one another.

14. The luggage system of claim 12 further comprising:
    a hanging bag having a fourth portion of an attachment mechanism attached to the exterior of the hanging bag, wherein the first and fourth portions of the attachment mechanism are attachable to one another.

15. A briefcase for a computer comprising:
    a first compartment for carrying the computer and peripherals, said first compartment further comprising a cover for said first compartment which includes a hinge mechanism intermediate said cover;

wherein the first compartment includes:
- a drawer;
- a floor; and
- a roller attached to the drawer and attached to the floor, said roller allowing the drawer to slide with respect to the floor of the first compartment; and a second compartment attached to the first compartment.

16. The briefcase of claim 15 wherein the main opening includes a zipper.

17. The briefcase of claim 15 wherein the second opening includes a zipper.

18. The briefcase of claim 15 further comprising a strap for holding the portable computer wherein the main opening includes a zipper.

\* \* \* \* \*